United States Patent
Li et al.

(10) Patent No.: US 10,289,303 B2
(45) Date of Patent: May 14, 2019

(54) FLASH CONTROLLER AND CONTROL METHOD FOR FLASH CONTROLLER

(71) Applicant: GIGADEVICE SEMICONDUCTOR (BEIJING) INC., Beijing (CN)

(72) Inventors: Baokui Li, Beijing (CN); Jinghua Wang, Beijing (CN); Nanfei Wang, Beijing (CN)

(73) Assignee: GIGADEVICE SEMICONDUCTOR (BEIJING) INC., Beijing (CN)

( * ) Notice: Subject to any disclaimer, the term of this patent is extended or adjusted under 35 U.S.C. 154(b) by 48 days.

(21) Appl. No.: 15/506,247

(22) PCT Filed: Jan. 30, 2015

(86) PCT No.: PCT/CN2015/071990
§ 371 (c)(1),
(2) Date: Feb. 24, 2017

(87) PCT Pub. No.: WO2016/106935
PCT Pub. Date: Jul. 7, 2016

(65) Prior Publication Data
US 2018/0217752 A1    Aug. 2, 2018

(30) Foreign Application Priority Data

Dec. 30, 2014 (CN) .......................... 2014 1 0851175

(51) Int. Cl.
*G06F 3/06* (2006.01)
*G06F 12/14* (2006.01)
(Continued)

(52) U.S. Cl.
CPC ............ *G06F 3/0604* (2013.01); *G06F 3/062* (2013.01); *G06F 3/064* (2013.01); *G06F 3/0659* (2013.01);
(Continued)

(58) Field of Classification Search
CPC ...... G03F 3/0604; G03F 3/0679; G06F 12/14; G06F 12/1441; G06F 21/60; G11C 16/22
See application file for complete search history.

(56) References Cited

U.S. PATENT DOCUMENTS 6,490,197 B1   12/2002 Fasoli
2005/0068842 A1*  3/2005 Tominaga ........... G06F 11/1441
                                                     365/232

(Continued)

FOREIGN PATENT DOCUMENTS

CN          1465161 A    12/2003
CN          1813229 A    8/2006
(Continued)

*Primary Examiner* — Tracy A Warren
(74) *Attorney, Agent, or Firm* — Gokalp Bayramoglu (57) ABSTRACT

A flash controller and a control method for the flash controller. The flash controller comprises an instruction bus interface, a data bus interface, a configuration register, an erase access filter module, a read/write access filter module and a flash control module. The read/write access filter module is configured to receive control information and determine whether the read/write access is sent to the flash control module or not. The erase access filter module is configured to receive control information and determine whether the erase access is sent to the flash control module or not. The flash control module is configured to complete an access to a flash memory. The present disclosure is used to protect programs from being stolen by a client, and also protect against a situation where companies collaboratively developing a program are able to steal programs from one another.

18 Claims, 4 Drawing Sheets

(51) Int. Cl.
*G06F 21/60* (2013.01)
*G11C 16/22* (2006.01)
*G06F 21/79* (2013.01)

(52) U.S. Cl.
CPC .......... *G06F 3/0679* (2013.01); *G06F 12/14* (2013.01); *G06F 21/60* (2013.01); *G06F 21/79* (2013.01); *G11C 16/22* (2013.01); *G06F 2221/2143* (2013.01)

(56) References Cited

U.S. PATENT DOCUMENTS

| | | | |
|---|---|---|---|
| 2005/0102478 A1* | 5/2005 | Tanaka | G06F 12/1458 711/152 |
| 2005/0114613 A1* | 5/2005 | Otani | G11C 5/04 711/154 |
| 2006/0149917 A1* | 7/2006 | O'Connor | G06F 12/1441 711/173 |
| 2006/0259785 A1 | 11/2006 | Thibadeau | |
| 2008/0256288 A1* | 10/2008 | Matsuoka | G06F 12/1433 711/103 |
| 2010/0174866 A1* | 7/2010 | Fujimoto | G06F 9/4401 711/115 |
| 2010/0290292 A1* | 11/2010 | Tanizaki | G11C 16/10 365/185.22 |
| 2011/0041039 A1* | 2/2011 | Harari | G06F 11/1068 714/773 |
| 2011/0191562 A1* | 8/2011 | Chou | G06F 12/06 711/163 |
| 2014/0082257 A1* | 3/2014 | Scouller | G06F 21/6218 711/103 |
| 2015/0100617 A1* | 4/2015 | Diederich | H04L 67/325 709/201 |

FOREIGN PATENT DOCUMENTS

| | | |
|---|---|---|
| CN | 1856841 A | 11/2006 |
| CN | 102789403 A | 11/2012 |
| CN | 102799391 A | 11/2012 |

\* cited by examiner

201 — receiving control information by using the read/write access filter module, and determining according to the control information whether to send a read/write access to the flash control module when the read/write access is received from the instruction bus interface or the data bus interface;

202 — receiving control information by using the erase access filter module, and determining according to the control information whether to send an erase access to the flash control module when the erase access is received from the configuration register;

203 — completing an access to a flash memory by using the flash control module according to the read/write access or the erase access

FIG. 4

FLASH CONTROLLER AND CONTROL METHOD FOR FLASH CONTROLLER

CROSS-REFERENCE TO RELATED APPLICATIONS

This application is the national phase of International Application No. PCT/CN2015/071990, filed Jan. 30, 2015, which is based on and claims priority to Chinese Patent Application No. 201410851175.3, filed on Dec. 30, 2014, the entire contents of which are incorporated herein by reference.

TECHNICAL FIELD

The present disclosure relates to the field of electronic circuit technologies, and in particular, to a flash controller and a control method for the flash controller.

BACKGROUND

With the improvement of integrated circuit (IC), the application of an MCU chip becomes more widely used from toys to construction machinery. An MCU chip usually comprises a central processing unit (CPU), a flash, a static random access memory (SRAM) and a variety of peripherals. When the MCU chip is power down, flash content is not lost, while SRAM content is. A flash memory is usually composed of two distinct areas: one is a user area, used to store user's program, the other is an information area, used to store configuration information of the MCU chip. SRAM is usually used as an on-chip memory.

For an MCU application solution provider, a manufacturer who develops program and PCB (printed circuit board) based on the MCU chip, the program will be recorded on the user area of a flash memory. The core value of the application solution provider is the program. Thus, the program should be protected from being stolen by others. The information protection method of an MCU chip is to protect the program stored in the user area of a flash memory from being stolen by others. The current information protection method for an MCU chip is only available to protect the program in the user area as a whole, but not able to protect a program developed by two or more cooperative companies. Because the current method can only be used to protect the program in the user area from being stolen by users, not be used to prevent the cooperative companies from stealing the program from each other.

Therefore, an urgent technical problem to be solved for the technicians in this field is: providing an information protection method for an MCU chip to protect the program from being stolen by users and prevent the companies who developed the program together from stealing program from each other.

SUMMARY

The present disclosure is to provide a flash controller to protect the program from being stolen by users and prevent the companies who developed the program together from stealing program from each other.

Accordingly, the present disclosure also provides a control method for flash controller, to ensure the implementation and application of the device.

To solve the problem above, the present disclosure discloses a flash controller, comprising: an instruction bus interface, a data bus interface, a configuration register, an erase access filter module, a read/write access filter module and a flash control module; wherein:

the read/write access filter module is configured to receive control information, and determine according to the control information whether to send a read/write access to the flash control module when the read/write access is received from the instruction bus interface or the data bus interface;

the erase access filter module is configured to receive control information, and determine according to the control information whether to send an erase access to the flash control module when the erase access is received from the configuration register; and the flash control module is configured to complete an access to a flash memory according to the read/write access or the erase access.

Preferably, the flash memory comprises a user area and an information area, an access of the flash control module to the flash memory comprises an access to the user area and an access to the information area, the control information comprises a sub-area protection working method, a reading protection level and a reading protection state, and the flash controller further comprises a sub-area protection control module and a reading protection control module;

the reading protection control module is configured to receive option bytes, determine whether a current access to the user area comes from a debugging method and determine a reading protection level and a reading protection state according to the option bytes, send the control information such as the reading protection level, the reading protection status and whether the current access to the user area comes from the debugging method or the like to the erase access filter module and the read/write access filter module; and the access comprises a read/write access and an erase access; and the sub-area protection control module is configured to determine a current sub-area protection working method.

Preferably, the flash controller further comprises option byte image and a debugging method monitoring module;

the option byte image is configured to duplicate option bytes in the information area; and the debugging method monitoring module is configured to monitor whether the current access to the user area comes from a debugging method.

Preferably, the flash controller comprises an internal bus matrix, and the read/write access comprises a read/write access needing to be immediately responded, a read/write access needing to be responded after a preset waiting time, and a read/write access not needing to be responded;

the read/write access filter module is configured to send a read/write access to the flash control module through the internal bus matrix when the read/write access is determined as the read/write access needing to be immediately responded, and generate a successful completion response and send the response to the corresponding instruction bus interface or the data bus interface when the flash control module completes an access to the flash memory according to the read/write access;

and/or the read/write access filter module is configured to send a read/write access to the flash control module through the internal bus matrix after a preset waiting time when the read/write access is determined as the read/write access needing to be responded after a preset waiting time, and generate a successful completion response and send the response to the corresponding instruction bus interface or the data bus interface when the flash control module completes an access to the flash memory according to the read/write access;

and/or the read/write access filter module is configured to generate an unsuccessful completion response and send the response to the corresponding instruction bus interface or the data bus interface when a read/write access is determined as a read/write access not needing to be responded.

Preferably, the read/write access comprises an access of modifying option bytes; and the read/write access filter module is further configured to send the same read/write access to the option byte image when the read/write access is an access of modifying option bytes.

Preferably, the erase access comprises an erase access needing to be responded and an erase access not needing to be responded;

the erase access filter module is configured to send an erase access to the flash control module when the erase access is determined as an erase access needing to be responded, and generate a success erase response signal and send the signal to the configuration register when the flash control module completes an access to the flash memory according to the erase access;

and/or the erase access filter module is configured to generate a failure erase response signal and send the signal to the configuration register when an erase access is determined as an erase access not needing to be responded.

Preferably, the configuration register comprises an erase access completion status bit; and the configuration register is configured to update the erase access completion status bit when the success erase response signal or the failure erase response signal is received.

Preferably, the configuration register comprises an error flag bit; and the configuration register is configured to update the error flag bit when the failure erase response signal is received.

Preferably, the internal bus matrix is an interconnection matrix of an instruction bus and a data bus.

Preferably, the flash controller comprises a main control module, and the main control module is configured to control various modules of the flash controller to work in coordination.

The present disclosure further discloses a control method for a flash controller, wherein the flash controller comprises an instruction bus interface, a data bus interface, a configuration register, an erase access filter module, a read/write access filter module and a flash control module; and the method comprises:

receiving control information by using the read/write access filter module, and deciding according to the control information whether to send a read/write access to the flash control module when the read/write access is received from the instruction bus interface or the data bus interface;

receiving control information by using the erase access filter module, and deciding according to the control information whether to send an erase access to the flash control module when the erase access is received from the configuration register; and completing an access to a flash memory by using the flash control module according to the read/write access or the erase access.

Preferably, the flash memory comprises a user area and an information area, an access of the flash control module to the flash memory comprises an access to the user area and an access to the information area, the control information comprises a sub-area protection working method, a reading protection level and a reading protection state, and the flash controller further comprises a sub-area protection control module and a reading protection control module; and the method further comprises:

receiving option bytes by using the reading protection control module; deciding whether a current access to the user area comes from a debugging method and determining a reading protection level and a reading protection state according to the option bytes; sending the control information such as the reading protection level, the reading protection state and whether the current access to the user area comes from the debugging method or the like to the erase access filter module and the read/write access filter module, wherein the access comprises a read/write access and an erase access; and determining a current sub-area protection working method by using the sub-area protection control module.

Preferably, the flash controller further comprises option byte image and a debugging method monitoring module; and the method further comprises:

duplicating option bytes in the information area by using the option byte image; and monitoring whether the current access to the user area comes from a debugging method by using the debugging method monitoring module.

Preferably, the flash controller comprises an internal bus matrix, and the read/write access comprises a read/write access needing to be immediately responded, a read/write access needing to be responded after a preset waiting time, and a read/write access not needing to be responded, and the method further comprises:

sending a read/write access to the flash control module by using the read/write access filter module through the internal bus matrix when the read/write access is determined as the read/write access needing to be immediately responded, and generating a successful completion response and sending the response to the corresponding instruction bus interface or the data bus interface when the flash control module completes an access to the flash memory according to the read/write access;

and/or sending a read/write access to the flash control module by using the read/write access filter module through the internal bus matrix after a preset waiting time when the read/write access is determined as the read/write access needing to be responded after a preset waiting time, and generating a successful completion response and sending the response to the corresponding instruction bus interface or the data bus interface when the flash control module completes an access to the flash memory according to the read/write access;

and/or generating an unsuccessful completion response and sending the response to the corresponding instruction bus interface or the data bus interface by using the read/write access filter module when a read/write access is determined as a read/write access not needing to be responded.

Preferably, the read/write access comprises an access of modifying option bytes; and the method further comprises:

sending the same read/write access to the option byte image by using the read/write access filter module when the read/write access is determined as an access of modifying option bytes.

Preferably, the erase access comprises an erase access needing to be responded and an erase access not needing to be responded; and the method further comprises:

sending an erase access to the flash control module by using the erase access filter module when the erase access is determined as an erase access needing to be responded, and generating a success erase response signal and sending the signal to the configuration register when the flash control module completes an access to the flash memory according to the erase access;

and/or generating a failure erase response signal and sending the signal to the configuration register by using the erase access filter module when an erase access is determined as an erase access not needing to be responded.

Preferably, the configuration register comprises an erase access completion status bit; and the method further comprises:

updating the erase access completion status bit by using the configuration register when the success erase response signal or the failure erase response signal is received.

Preferably, the configuration register comprises an error flag bit; and the method further comprises:

updating the error flag bit by using the configuration register when the failure erase response signal is received.

Preferably, the internal bus matrix is an interconnection matrix of an instruction bus and a data bus.

The present disclosure further discloses a computer-readable recording medium having recorded thereon a program for executing the method above.

Compared with the prior art, the embodiments of the present disclosure include following advantages.

In the embodiments of the present disclosure, when a read/write access or an erase access is received, the read/write access filter module and the erase access filter module may determine according to the received control information whether to send the read/write access or the erase access to the flash control module so that the flash control modules complete an access to a flash memory according to the read/write access or the erase access. According to the embodiments of the present disclosure, when a plurality of companies are collaboratively developing a program, it is determined that whether an access to a flash memory is allowed according to control information. In this way, it is available to protect the program in the user area from been stolen by cooperative companies develop the programs together.

DETAILED DESCRIPTION OF INVENTION

In order to understand the objects, features and advantages of the present disclosure described above more apparently, specific description in conjunction with the accompanying drawings are provided hereinafter.

An embodiment of the present disclosure of an information protection method for MCU is described below.

The reading protection level of the flash controller is controlled by a number of control bytes in an information area of the flash memory. The reading protection level of the flash controller is divided into three levels, characterizations of each level are as follows:

zero-level reading protection: a user area of the flash memory is completely accessible, allowed to perform reading, writing and erasing on the user area; the information area is completely accessible as well.

first-level reading protection: the user area can be accessed normally when the MCU chip boots from the user area; other booting methods (including booting from other areas and joint test action group (JTAG) and other debugging methods) cannot access user area, reading, writing, erasing or other operations are not allowed to be performed. At this level, information area is allowed to be accessed. But if the reading protection level of flash controller is changed to zero level by modifying control bits, all the information in user area is erased.

second-level reading protection: the user area can be accessed normally when the MCU chip boots from the user area; other booting methods (including booting from other areas and joint test action group (JTAG) and other debugging methods) are all disenabled. At this level the information area is read-only, cannot be written or erased.

In the above-mentioned information protection method of the MCU chip, the user area is protected as a whole. If the program of MCU chip is developed by one company, this method is able to meet the demand. But the MCU chip is becoming increasingly complex, so as the program in the MCU chip. The program is required to be developed by two or more companies. The current information protection method is failing to satisfy the requirements. The current method is only able to protect the user area from being stolen by users, but not able to prevent cooperative companies from stealing from each other. Based on the above-mentioned requirements, a new information protection method for an MCU chip is further provided by the present disclosure.

The information protection method for an MCU chip proposed by the embodiment of the present disclosure is able to meet the protection needs for program of MCU chips developed by two or more cooperative companies. In the embodiment of the present disclosure, the user area of the flash memory is divided into a plurality of sub-areas, and programs of the cooperative companies can be written separately in their own sub-areas. The embodiment of the present disclosure is able to ensure that the programs developed by a plurality of companies not only mutually invoke each other normally, but also prevent them from stealing the other's program in the other sub-area. Meanwhile, it is also able to prevent the program stored in the user area from being stolen by the users. Besides, if SRAM or other peripherals are shared by a plurality of cooperative companies, program might be stolen by the other companies through the shared resources. In the embodiment of the present application, it may also allocate a specific SRAM or a peripheral to one company as a private device to broaden the application range of the embodiment of the present disclosure.

Figure 1:
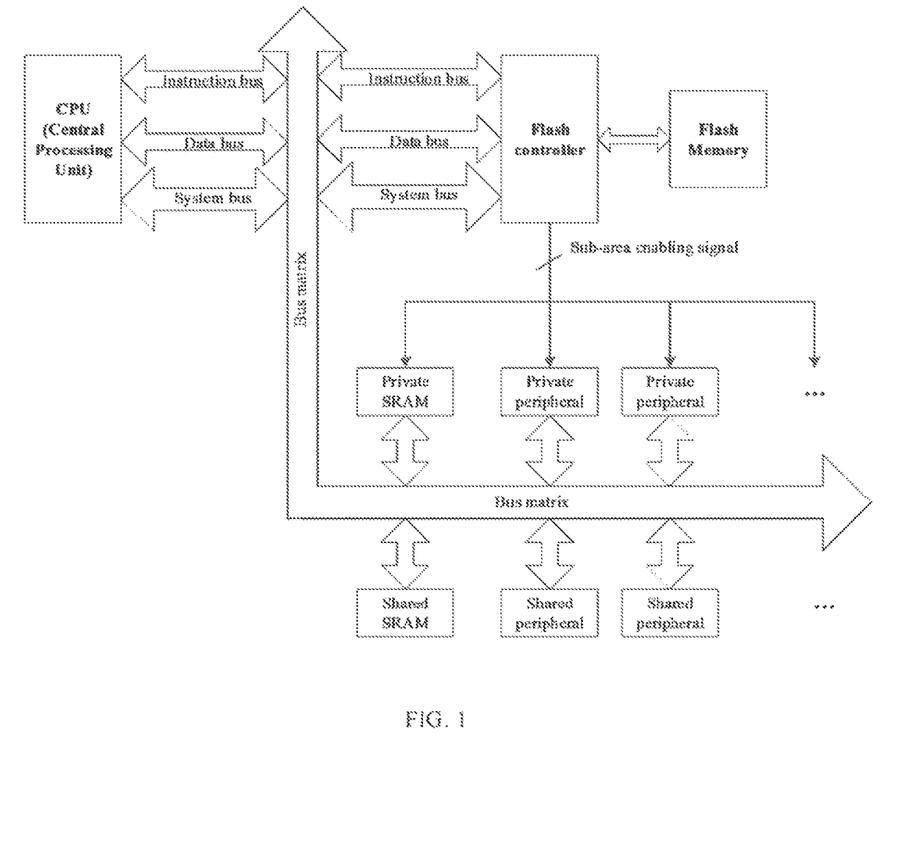
FIG. 1 is a schematic diagram showing the system structure of a system of an MCU chip based on a Harvard architecture CPU according to the present disclosure.

FIG. 1 depicts a system schematic of an MCU chip based on a CPU with a Harvard architecture for the present disclosure, the MCU chip usually comprises a CPU, a bus, a flash, a flash controller, SRAM, a variety of master peripherals and slave peripherals and so on. The bus may comprise an instruction bus, a data bus and a system bus. In the specific implementation, CPU is connected with bus matrix through the instruction bus, data bus and system bus. The instruction bus is responsible for reading the instructions; the data bus is responsible for data access; the system bus is responsible for accessing peripherals.

The flash controller of the MCU chip is a bridge for connecting the bus and the flash. The flash controller is connected with bus matrix also through the three buses. The instruction bus is responsible for accepting instruction access from the CPU, the data bus is responsible for accepting CPU data access. The configuration registers of the flash controller are accessed through the system bus. SRAM and all kinds of peripherals are both connected with bus matrix. In the embodiment of present disclosure, if the MCU chip is cooperatively developed by a plurality of companies, each company can be allocated a sub-area. A peripheral can be designed as the private peripheral for one sub-area. Each sub-area has the corresponding sub-area enabling signal. The private peripheral is controlled by the sub-area enabling signal output by the flash controller.

In the specific implementation, "access" comprises all kinds of operations. The operations for bus of MCU chip comprising reading and writing which means that the bus access comprises operations of reading and writing. The flash comprises reading, writing and erasing operations, meaning the access to flash comprises operations including reading, writing and erasing.

Figure 2:
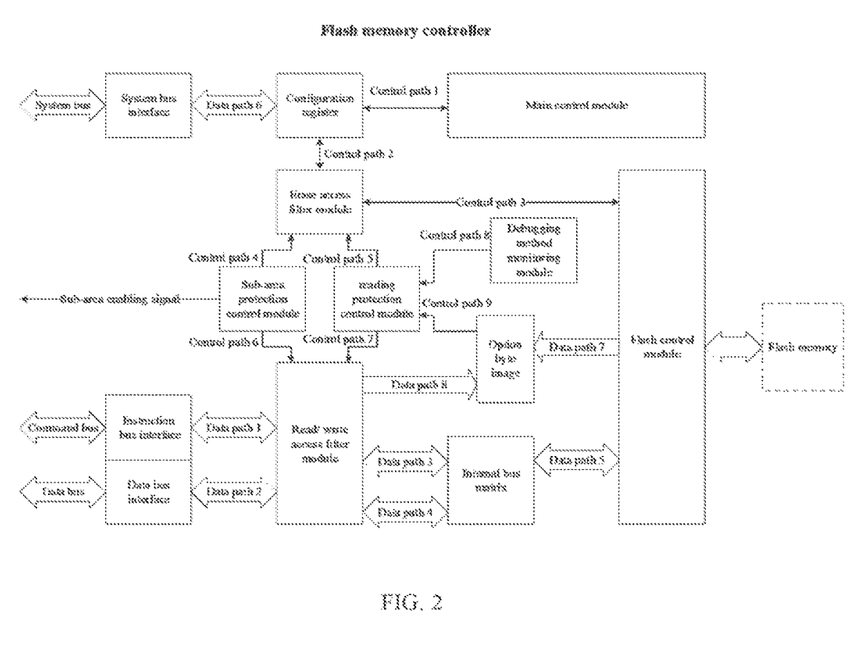
FIG. 2 is a block diagram showing the structure of a flash controller according to embodiments of the present disclosure.

Referring to FIG. 2, a structural block diagram of a flash controller is illustrated according to embodiments of the present disclosure, wherein the flash controller may include: an instruction bus interface, a data bus interface, a configuration register, an erase access filter module, a read/write access filter module and a flash control module.

The read/write access filter module is configured to receive control information, and determine according to the control information whether to send a read/write access to the flash control module when the read/write access is received from the instruction bus interface or the data bus interface.

The erase access filter module is configured to receive control information, and determine according to the control information whether to send an erase access to the flash control module when the erase access is received from the configuration register.

The flash control module is configured to complete an access to a flash memory according to the read/write access or the erase access.

In one preferred embodiment of the present disclosure, the flash controller includes an internal bus matrix, and the read/write access includes a read/write access needing to be immediately responded, a read/write access needing to be responded after a preset waiting time, and a read/write access not needing to be responded.

The read/write access filter module is configured to send a read/write access to the flash control module through the internal bus matrix when the read/write access is determined as the read/write access needing to be immediately responded, and generate a successful completion response and send the response to the corresponding instruction bus interface or the data bus interface when the flash control module completes an access to the flash memory according to the read/write access; which means that, if the flash memory is accessed by the instruction bus, then the successful completion response is sent to the instruction bus interface; while, if the flash memory is accessed by the data bus, then the successful completion response is sent to the data bus interface;

and/or the read/write access filter module is configured to send a read/write access to the flash control module through the internal bus matrix after a preset waiting time when the read/write access is determined as the read/write access needing to be responded after a preset waiting time, and generate a successful completion response and send the response to the corresponding instruction bus interface or the data bus interface when the flash control module completes an access to the flash memory according to the read/write access; which means that, if the flash memory is accessed by the instruction bus, then the successful completion response is sent to the instruction bus interface; while, if the flash memory is accessed by the data bus, then the successful completion response is sent to the data bus interface.

and/or the read/write access filter module is configured to generate an unsuccessful completion response and send the response to the corresponding instruction bus interface or the data bus interface when a read/write access is determined as a read/write access not needing to be responded.

The read/write access filter module is configured to pass read/write accesses needing to be immediately responded immediately, pass read/write accesses needing to be responded after a preset waiting time after a delay, and filter out (that is, block) read/write accesses not needing to be responded. The control of the read/write access filter module is based on the sub-area protection working method and reading protection method, and control information sent from a control path 6 and a control path 7. Read/write accesses from the instruction bus interface and the data bus interface are sent to the read/write access filter module respectively through a data path 1 and a data path 2; and read/write accesses from the instruction bus interface and the data bus interface which are not filtered out are sent to the internal bus matrix respectively through a data path 3 and a data path 4. To the read/write accesses needing to be immediately responded, the read/write access filter module may immediately send them to the internal bus matrix, and may send a successful completion response to a corresponding bus interface (the instruction bus interface or the data bus interface) when an access is completed. To read/write accesses needing to be responded after a preset waiting time, the read/write access filter module may send them to the internal bus matrix after a preset waiting time, and may send a successful completion response to a corresponding bus interface when an access is completed. To read/write accesses not needing to be responded, the read/write access filter module may not send them to the internal bus matrix, but instead directly send an unsuccessful completion response to a corresponding bus interface.

In the embodiments of the present disclosure, the flash control module is configured to control a flash memory according to a control method and timing requirements of the flash memory to complete various accesses to the flash memory.

In one preferred embodiment of the present disclosure, the read/write access may include an access of modifying option bytes.

The read/write access filter module is further configured to send the same read/write access to the option byte image when the read/write access is an access of modifying option bytes.

In the embodiments of the present disclosure, if a current access is the access of modifying option bytes needing to be responded, the read/write access filter module may send the same access to the option byte image through a data path 8.

In one preferred embodiment of the present disclosure, the erase access includes an erase access needing to be responded and an erase access not needing to be responded.

The erase access filter module is configured to send an erase access to the flash control module when the erase access is determined as an erase access needing to be responded, and generate a success erase response signal and send the signal to the configuration register when the flash control module completes an access to the flash memory according to the erase access;

and/or the erase access filter module is configured to generate a failure erase response signal and send the signal to the configuration register when an erase access is determined as an erase access not needing to be responded.

In one preferred embodiment of the present disclosure, the configuration register includes an erase access completion status bit.

The configuration register is configured to update the erase access completion status bit when the success erase response signal or the failure erase response signal is received.

In one alternative embodiment of the present disclosure, the configuration register may include an error flag bit.

The configuration register is configured to update the error flag bit when the failure erase response signal is received.

Referring to FIG. 2, the instruction bus interface is connected to an instruction bus, and the data bus interface is connected to a data bus. They are configured to accept an access of a corresponding bus by following a bus protocol, send a read/write access of the corresponding bus to the read/write access filter module via the data path 1 and the data path 2, and generate a bus response according to a state of read/write access filter module. The bus response includes information on whether the current read/write access is completed and whether the current read/write access is completed correctly, etc.

A system bus interface is connected to a system bus. The system bus accesses the configuration register through the system bus interface and a data path 6. The configuration register includes all configuration information and state information of the flash controller. A working mode of the flash controller may be adjusted by modifying the configuration register, and a working state of the flash controller may be known by querying the configuration register. Relevant control information is interacted with a main control module through a control path 1. An erase access to the flash memory is issued by the configuration register. The configuration register includes address space needing to be erased and an erase-enabled relevant configuration bit, and also includes an erase access completion status bit representing whether an erase access is completed. Relevant control information is interacted with the erase access filter module through a control path 2.

The erase access filter module is configured to pass erase access needing to be responded and filter out an erase access not needing to be responded. The control of the erase access filter module is based on the sub-area protection working method and reading protection method, and control information sent from a control path 4 and a control path 5. The erase access needing to be responded is issued by the configuration register, gets to the erase access filter module through the control path 2 and then gets to the flash control module through a control path 3, and is completed by the flash control module by controlling the flash memory; completion information is fed back to the configuration register through the control path 3, the erase access filter module and the control path 2 to update the erase access completion status bit. The erase access not needing to be responded is issued by the configuration register and gets to the erase access filter module through the control path 2, wherein the erase access filter module does not send the access to the flash control module but instead directly feeds the completion information back to the configuration register through the control path 2 to update the erase access completion status bit. Optionally, in the embodiments of the present disclosure, if the configuration register has an erase access error flag bit, at the moment this flag bit is set to high which indicates the erase access goes wrong.

In one preferred embodiment of the present disclosure, the internal bus matrix is an interconnection matrix of an instruction bus and a data bus.

Referring to FIG. 2, the internal bus matrix is a typical bus interconnection matrix. The internal bus matrix is configured to combine two buses (a data path 3 and a data path 4) into one bus (a data path 5). When an access occurs on one of the data path 3 and the data path 4, the internal bus matrix may directly send the access to the flash control module through the data path 5. When accesses simultaneously occur on the data path 3 and the data path 4, the internal bus matrix may select and send one access to the flash control module through the data path 5, and then send the other access to the flash control module through the data path 5 after the previous access is completed. Although there are many selection methods, a preference may be always given to an access from the data path 4, and of course other selection methods may be adopted, which is not limited in the embodiments of the present disclosure.

In one preferred embodiment of the present disclosure, the flash controller may further include a main control module, which is used to control various modules of the flash controller to work in coordination.

In one preferred embodiment of the present disclosure, the flash memory may include a user area and an information area, an access of the flash control module to the flash memory may include an access to the user area and an access to the information area, the control information may include a sub-area protection working method, a reading protection level and a reading protection state, and the flash controller may further include a sub-area protection control module and a reading protection control module.

The reading protection control module is configured to receive option bytes, determine whether a current access to the user area comes from a debugging method and determine a reading protection level and a reading protection state according to the option bytes, send the control information such as the reading protection level, the reading protection state and whether the current access to the user area comes from the debugging method or the like to the erase access filter module and the read/write access filter module; and the access includes a read/write access and an erase access.

The sub-area protection control module is configured to determine a current sub-area protection working method.

Referring to FIG. 2, the reading protection control module in this example is configured to determine whether a current access comes from a debugging method according to information sent from a control path 8, determine a current reading protection level and a reading protection state according to information sent from a control path 9, send control information related to the erase access to the erase access filter module through the control path 5, and send control information related to the read/write access to the read/write access filter module through the control path 7.

The sub-area protection control module is configured to determine a current sub-area working state according to a sub-area protection working method, including an initial state, and a sub-area working state and a transition state of each sub-area. The sub-area protection control module is also configured to send current state information to the erase access filter module through the control path 4, and send the current state information to the read/write access filter module through the control path 6.

In one preferred embodiment of the present disclosure, the flash controller further includes an option byte image and a debugging method monitoring module.

The option byte image is configured to duplicate option bytes in the information area.

The debugging method monitoring module is configured to monitor whether the current access to the user area comes from a debugging method.

Referring to FIG. 2, the option byte image in this embodiment is an image register of option bytes in the information area. The content of the option byte image keeps consistent with the option bytes in the information area all the time. When a chip powers up, the flash control module may automatically copy the content of option bytes in the information area to the option byte image through a data path 7. When a chip runs, to modify the option bytes, the read/write access filter module may simultaneously modify the option byte image through the data path 8.

The debugging method monitoring module is used to monitor whether the current access to the user area comes from a debugging method. In the embodiments of the present disclosure, other master peripherals except a CPU are forbidden to access the user area. Therefore, all accesses to the user area may only come from the CPU. If the CPU boots from the user area, it is determined that the current access comes from a normal working mode. If the CPU boots from other locations (for example, an on-chip SRAM) or is under the control of other debugging interfaces (for example, JTAG), it is determined that the current access comes from a debugging method.

The application of the present embodiment at least has the following two advantages: firstly, the content in flash is protected from being stolen by users; secondly, the cooperative companies which develop the program together are prevented from stealing the program from each other.

There is definitely a master company which develops the main program, and the other is to develop library function. The master company which develops the main program is called the master company while the others which develop library function are called the slave companies hereinafter, each company can be allocated a sub-area. The master sub-area is located in the beginning of the address space in the user area, the slave sub-areas are located in the following address space in the user area. When the MCU chip boots, the program developed by the master company is performed. The information protection method for an MCU chip in the present embodiment can be described in three parts: the first part is sub-area protection method; the second part is definition and application method of reading protection; the third part is the implementation method of private peripheral.

The first part: sub-area protection method.

When the MCU chip boots from the user area, the user area may be normally accessed by the CPU instruction bus and restrictedly accessed by the CPU data bus, but cannot be accessed by other master peripherals.

Figure 3:
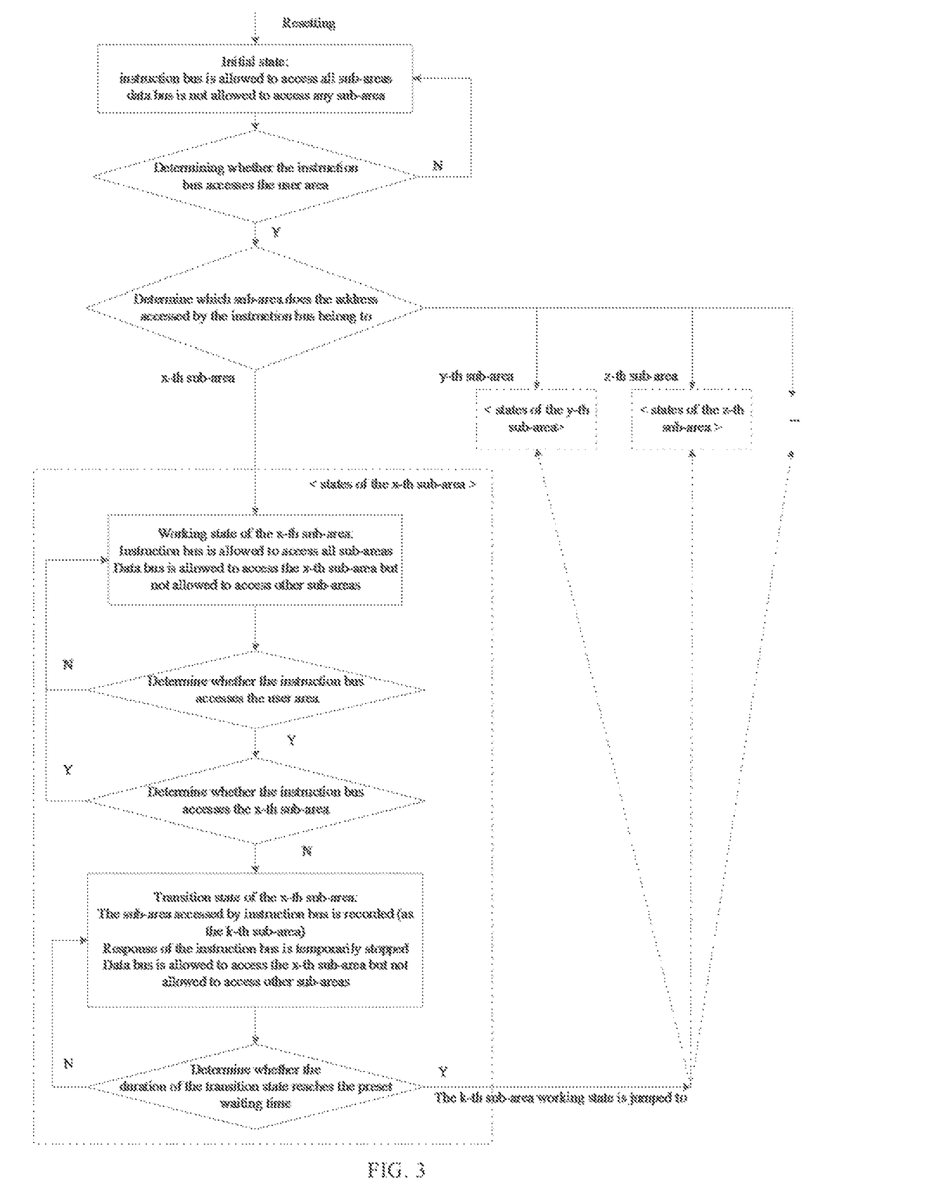
FIG. 3 is a schematic diagram showing a work flow of an MCU chip flash controller based on a plurality of sub-areas according to the present disclosure.

According to the schematic diagram of the work flow of a flash controller in an MCU chip based on a plurality of sub-areas for the present disclosure shown in FIG. 3, in the present embodiment, the user area includes a plurality of sub-areas with a number of n, each sub-area comprises a corresponding working state, a transition state and a series of determination conditions. FIG. 3 describes the working state of the x-th sub-area in detail, while the working states of the other sub-areas are similar. The number of sub-areas and the number of sub-area working states are consistent. For better understanding, in the following steps, only the working states of the x-th, y-th and z-th sub-areas are described. Where, x, y and z are any positive integers larger than or equal to 1 and less than or equal to n, x, y and z are not equal to each other, and k is not equal to x. If n is equal to 2, which is special, there are only two positive integers between 1 and n. Under the above circumstance, z does not exit. The specific steps are as follows:

After resetting the MCU chip, the flash controller enters an initial state. Under the initial state, the instruction bus is allowed to access all of the sub-areas, the data bus is not allowed to access any sub-area. If the instruction bus does not access the user area, the initial state remains; otherwise, according to the sub-area that the address accessed by the instruction bus belongs to, the corresponding working state of the sub-area is jumped to.

Under the working state of x-th sub-area, the instruction bus is allowed to access all of the sub-areas, the data bus is only allowed to access the x-th sub-area, but not allowed to access other sub-areas (if other sub-areas are accessed, an error response is returned). If the instruction bus does not access the user area, the current state remains; otherwise, if the instruction bus accesses the x-th sub-area, the current sub-area working state remains, if the instruction bus accesses other sub-area, the transition state of the x-th sub-area is jumped to.

Under the transition state of the x-th sub-area, firstly, the sub-area accessed by the instruction bus is recorded (as the k-th sub-area), at the same time, the response of the instruction bus is temporarily stopped, the data bus is allowed to access the x-th sub-area but not allowed to access other sub-areas (when other sub-areas are accessed, an error response is returned). If the duration of the transition state does not reach the preset waiting time, the current state remains, otherwise, the k-th sub-area working state is jumped to.

In a detailed embodiment of the present disclosure, the preset waiting time in the transition state is correlated with the CPU features of the MCU chip. The CPU with a Harvard architecture reads the instructions through the instruction bus, accesses data through the data bus. The two operations work in parallel. The CPU obtains the instruction ought to execute through the instruction bus, then determines whether to access data, and data of which address is ought to be accessed through instruction parsing, then accomplishes corresponding data accessing through data bus.

The procedure from reading instructions by the instruction bus to accomplishing corresponding data accessing by the data bus goes through a number of cycles. The transition state is to make sure that the data accessing corresponding to the instruction for current working sub-area is accomplished, meanwhile prevent the instruction bus from accessing other sub-areas. When the data accessing for current working sub-area is accomplished, a new working sub-area is jumped to. The waiting time needs to be long enough to ensure the data accessing of the current working sub-area is completely accomplished. Take the ARM Cortex-M3 as an example, the waiting time can be set as 20 CPU clock cycles.

The second part: definition and application method of reading protection.

In a preferred embodiment, the MCU chip comprises an information area, the information area comprises option bytes; the user area is protected according to reading protection levels, and each sub-area is further protected according to the corresponding reading protection state; the method may further comprises the following step:

determining the reading protection level of the user area and the reading protection states of the plurality of sub-areas according to the option bytes. The reading protection is to restrict the accessing to the user area by all kinds of debugging methods. The debugging methods refer to all booting methods except booting from the user area, as well as debugging methods like Joint Test Action Group (JTAG). At the above-mentioned reading protection level or under the above-mentioned reading protection states, if the MCU chip boots from the user area, the user area can be accessed by CPU according to the sub-area protection methods.

The reading protection level includes three levels, which are a zero-level, a first-level and a second-level. The reading protection state is only valid at the first-level reading protection, and each sub-area of the user area comprises a corresponding sub-area reading protection state. The reading protection states of the plurality of sub-areas can be valid or invalid at the same time. The control method that the option bytes controls the reading protection level and the reading protection state is optional, as long as the reading protection levels and the reading protection states can be distinguished and switched according to the above requirements. A control method is described below as an embodiment. The reading protection level is controlled by one byte: when the byte is 0xA5 (0x represents the Hexadecimal number of A5), the reading protection level is zero-level; when the byte is 0xFF, the reading protection level is first-level; when the byte is 0x5A, the reading protection level is second-level. The reading protection states of sub-areas with a number of n are controlled by the same number of bytes: if one of the bytes is 0xFF, the corresponding reading protection state of the sub-area is invalid; if one of the bytes is 0x00, the corresponding reading protection state of the sub-area is valid.

The reading protection level and the reading protection state comprise the following characteristics:

the zero-level reading protection is a default setting of the MCU chip. At zero level reading protection, the user area can accept an access of all kinds of debugging methods, the option bytes is allowed to accept operations of reading, writing and erasing.

the first-level reading protection is for the program development procedure conducted by cooperative companies. At the first-level reading protection, each of the sub-area in the user area has the corresponding reading protection state. When the reading protection state is invalid, the corresponding sub-area is allowed to be accessed by all kinds of debugging methods; when the reading protection state is valid, the corresponding sub-area is not allowed to be accessed by any debugging method. The default setting of the MCU chip is that the reading protection state of each sub-area is invalid. The option bytes are allowed to accept operations of reading, writing and erasing. Namely, the reading protection state and the reading protection level can be arbitrarily changed. However, once a valid reading protection state is changed into invalid, all the contents in the corresponding sub-area are erased before the reading protection state becomes invalid; if the reading protection level is changed into zero-level, all the contents in the user area are erased before the reading protection level becomes zero-level.

the second-level reading protection is the reading protection level when the MCU chip is given to the end users. At the second-level reading protection, all kinds of debugging methods are disabled, the option bytes are only allowed to accept reading operations, not allowed to accept operations of writing or erasing.

The third part: implementation method of private peripheral.

In a preferred embodiment of the present disclosure, an on-chip private peripheral can be implemented on the MCU chip. There is a corresponding sub-area enabling signal for each sub-area. The private sub-area can be configured to work normally only when the corresponding sub-area enabling signal is high.

In the present embodiment, the private peripheral is the peripheral controlled by the sub-area enabling signal output by flash controller. Each sub-area may correspond to a 1-bit sub-area enabling signal. The sub-area enabling signal indicates that the corresponding sub-area is in working state. The sub-area enabling signal is high in the corresponding sub-area's sub-area working state and sub-area transition state, while it is low in the other states. The controlling method is to enable or disable parts or all of the functions of the corresponding peripheral according to the state of the sub-area enabling signal.

For instance, to ensure one SRAM is only allowed to be read by the program of the master company, the master sub-area enabling signal can be used as the reading enabling signal of the SRAM; to make sure the operation results register of one private peripheral is only allowed to be read by the program of a slave company, the sub-area enabling signal corresponding to the slave company can be used as the reading enabling signal for the operation results register to make sure one private peripheral is only allowed to be configured by the program of the master company, the master sub-area enabling signal can be used as the configuration enabling signal for the peripheral register.

Apparently, private peripheral may not be implemented in practice. That is, all of the peripherals may be shared, the present embodiment is not restricted hereto.

Figure 4:
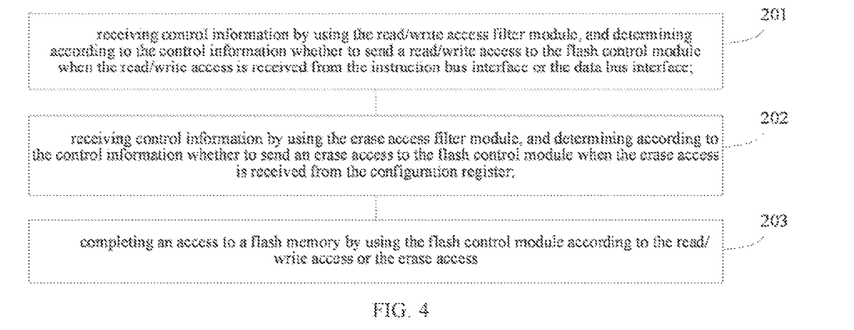
FIG. 4 is a flow chart showing steps of a control method for the flash controller according to embodiments of the present disclosure.

Referring to FIG. 4, it is a flow chart showing steps of a control method for the flash controller according to embodiments of the present disclosure, wherein the flash controller may include an instruction bus interface, a data bus interface, a configuration register, an erase access filter module, a read/write access filter module and a flash control module; and the method includes following steps:

Step 201: receiving control information by using the read/write access filter module, and determining according to the control information whether to send a read/write access to the flash control module when the read/write access is received from the instruction bus interface or the data bus interface;

Step 202: receiving control information by using the erase access filter module, and determining according to the control information whether to send an erase access to the flash control module when the erase access is received from the configuration register; and Step 203: completing an access to a flash memory by using the flash control module according to the read/write access or the erase access.

In one preferred embodiment of the present disclosure, the flash memory includes a user area and an information area, an access of the flash control module to the flash memory includes an access to the user area and an access to the information area, the control information includes a sub-area protection working method, a reading protection level and a reading protection state, and the flash controller further includes a sub-area protection control module and a reading protection control module; and the method may further include following steps:

receiving option bytes by using the reading protection control module; determining whether a current access to the user area comes from a debugging method and determining a reading protection level and a reading protection state according to the option bytes; and sending the control information such as the reading protection level, the reading protection state and whether the current access to the user area comes from the debugging method or the like to the erase access filter module and the read/write access filter module, wherein the access includes a read/write access and an erase access; and determining a current sub-area protection working method by using the sub-area protection control module.

In one preferred embodiment of the present disclosure, the flash controller further includes option byte image and a debugging method monitoring module; and the method may further include following steps:

duplicating option bytes in the information area by using the option byte image; and monitoring whether the current access to the user area comes from a debugging method by using the debugging method monitoring module.

In one preferred embodiment of the present disclosure, the flash controller includes an internal bus matrix, and the read/write access includes a read/write access needing to be immediately responded, a read/write access needing to be responded after a preset waiting time, and a read/write access not needing to be responded; and the method may further include following steps:

sending a read/write access to the flash control module by using the read/write access filter module through the internal bus matrix when the read/write access is determined as the read/write access needing to be immediately responded, and generate a successful completion response and sending the response to the corresponding instruction bus interface or the data bus interface when the flash control module completes an access to the flash memory according to the read/write access; which means that, if the flash memory is accessed by the instruction bus, the successful completion response is sent to the instruction bus interface; while, if the flash memory is accessed by the data bus, the successful completion response is sent to the data bus interface;

and/or sending a read/write access to the flash control module by using the read/write access filter module through the internal bus matrix after a preset waiting time when the read/write access is determined as the read/write access needing to be responded after a preset waiting time, and generate a successful completion response and sending the response to the corresponding instruction bus interface or the data bus interface when the flash control module completes an access to the flash memory according to the read/write access; which means that, if the flash memory is accessed by the instruction bus, the successful completion response is sent to the instruction bus interface; while, if the flash memory is accessed by the data bus, the successful completion response is sent to the data bus interface;

and/or generating an unsuccessful completion response and sending the response to the corresponding instruction bus interface or the data bus interface by using the read/write access filter module when a read/write access is determined as a read/write access not needing to be responded.

In one preferred embodiment of the present disclosure, the read/write access includes an access of modifying option bytes; and the method may further include following steps:

sending the same read/write access to the option byte image by using the read/write access filter module when the read/write access is determined as an access of modifying option bytes.

In one preferred embodiment of the present disclosure, the erase access includes an erase access needing to be responded and an erase access not needing to be responded; and the method may further include following steps:

sending an erase access to the flash control module by using the erase access filter module when the erase access is determined as an erase access needing to be responded, and generate a success erase response signal and sending the signal to the configuration register when the flash control module completes an access to the flash memory according to the erase access;

and/or generating a failure erase response signal and send the signal to the configuration register by using the erase access filter module when an erase access is determined as an erase access not needing to be responded.

In one preferred embodiment of the present disclosure, the configuration register includes an erase access completion status bit.

Update the erase access completion status bit by using the configuration register when the success erase response signal or the failure erase response signal is received.

In one preferred embodiment of the present disclosure, the configuration register includes an error flag bit; and the method may further include following steps:

updating the error flag bit by using the configuration register when the failure erase response signal is received.

In one preferred embodiment of the present disclosure, the internal bus matrix is an interconnection matrix of an instruction bus and a data bus.

In one preferred embodiment of the present disclosure, the flash controller includes a main control module, and the method further includes:

controlling various modules of the flash controller to work in coordination by using the main control module.

It should be noted that, for the convenience of description, the embodiments of the present disclosure are all depicted as series of action combination. But one skilled in the art shall be aware that the embodiment is not restricted to the action sequence, because some of the steps may be performed in other sequences or simultaneously according to the embodiments. Besides, one skilled in the art shall also be aware that the embodiments depicted in the detailed description part are all preferred embodiments, the related actions may not be necessary for the embodiments of the present disclosure.

The embodiment of the present disclosure further provides a computer readable recording medium recorded with a program for executing the program of the above embodiments.

The computer readable recording medium comprises all kinds of mechanisms for information storing and transmitting. The mechanisms shall be in form of machine-readable (e.g., computer readable). For instance, the machine-readable medium includes read-only memory (ROM), random access memory (RAM), disk memory media, optical memory media, flash media; electrical, optical, acoustic or other forms of propagated signals (e.g., carrier signal, infrared signal, digital signal, etc.) etc.

The embodiments in the present disclosure are disclosed progressively, each embodiment mainly emphasizes the differences from other embodiments, while similar parts for different embodiments may be referred to each other.

The above describes the details of a flash controller and a control method for a flash controller. The present disclosure applies specific embodiments to explain the theory and implementation method and describe the method and core ideas. Meanwhile, one skilled in the art may make modification or improvement on the basis of the present disclosure on the implementation methods or application scope. To sum up, the description above may not be taken as restriction to the disclosure.

What is claimed is:

1. A flash controller, comprising:
an instruction bus interface;
a data bus interface;
a configuration register;
an erase access filter module;
a read/write access filter module; and
a flash control module;
wherein the read/write access filter module is configured to receive control information, and determine according to the control information whether to send a read/write access to the flash control module when the read/write access is received from the instruction bus interface or the data bus interface;
wherein the erase access filter module is configured to receive the control information, and determine according to the control information whether to send an erase access to the flash control module when the erase access is received from the configuration register; and
wherein the flash control module is configured to complete an access to a flash memory according to the read/write access or the erase access;
wherein the flash memory comprises a user area configured to store a user program and an information area configured to store configuration information of a micro controller unit (MCU) chip, the access to the flash memory is an access to the user area or an access to the information area, the control information comprises a sub-area protection working method, a reading protection level controlled by a plurality of control bytes in the information area and a reading protection state, and the flash controller further comprises a sub-area protection control module and a reading protection control module;
wherein the reading protection control module is configured to receive option bytes from the information area, determine whether a current access to the user area comes from a debugging method, determine the reading protection level and the reading protection state according to the option bytes, send the control information including the reading protection level, the reading protection state and whether the current access to the user area comes from the debugging method to the erase access filter module and the read/write access filter module; the current access to the user area is the read/write access or the erase access; and
the sub-area protection control module is configured to determine a current sub-area protection working method;
when the MCU chip boots from the user area, the user area is normally accessed by a central processing unit (CPU) instruction bus and restrictedly accessed by a central processing unit (CPU) data bus, but is not accessed by other master peripherals; the user area includes a plurality of sub-areas, each of the plurality of sub-areas comprises a corresponding working state and a transition state; after resetting the MCU chip, the flash controller enters an initial state; under the initial state, the CPU instruction bus is allowed to access all of the sub-areas, the CPU data bus is not allowed to access any of the sub-areas;
wherein the flash controller further comprises an option byte image and a debugging method monitoring module;
the option byte image is configured to duplicate the option bytes in the information area; and
the debugging method monitoring module is configured to monitor whether the current access to the user area comes from the debugging method.

2. The flash controller according to claim 1, wherein the flash controller comprises an internal bus matrix, and the read/write access is a read/write access needing to be immediately responded, a read/write access needing to be responded after a preset waiting time, or a read/write access not needing to be responded;
wherein the read/write access filter module is configured to generate at least one of the following completion response:
send a first read/write access to the flash control module through the internal bus matrix when the first read/write access is determined as the read/write access needing to be immediately responded, and generate a first successful completion response and send the first successful completion response to the corresponding instruction bus interface or the data bus interface when the flash control module completes a first access to the flash memory according to the first read/write access;
or
send a second read/write access to the flash control module through the internal bus matrix after a preset waiting time when the second read/write access is determined as the read/write access needing to be responded after a preset waiting time, and generate a second successful completion response and send the second successful completion response to the corresponding instruction bus interface or the data bus interface when the flash control module completes a second access to the flash memory according to the second read/write access;
or
generate an unsuccessful completion response and send the response to the corresponding instruction bus interface or the data bus interface when a third read/write access is determined as the read/write access not needing to be responded.

3. The flash controller according to claim 1, wherein the read/write access comprises an access of modifying option bytes; and
the read/write access filter module is further configured to send the read/write accesses to an option byte image when the read/write access is the access of modifying option bytes.

4. The flash controller according to claim 1, wherein the erase access is an erase access needing to be responded or an erase access not needing to be responded;
wherein the erase access filter module is configured to perform at least one of the following
send a first erase access to the flash control module when the first erase access is determined as the erase access needing to be responded, and generate a success erase response signal and send the success erase response signal to the configuration register when the flash control module completes a first access to the flash memory according to the first erase access;

or generate a failure erase response signal and send the failure erase response signal to the configuration register when a second erase access is determined as the erase access not needing to be responded.

5. The flash controller according to claim 1, wherein the configuration register comprises an erase access completion status bit; and the configuration register is configured to update the erase access completion status bit when a success erase response signal or a failure erase response signal is received.

6. The flash controller according to claim 5, wherein the configuration register comprises an error flag bit; and the configuration register is configured to update the error flag bit when the failure erase response signal is received.

7. The flash controller according to claim 2, wherein the internal bus matrix is an interconnection matrix of an instruction bus and a data bus.

8. The flash controller according to claim 1, wherein the flash controller comprises a main control module, and the main control module is configured to control various modules of the flash controller to work in coordination.

9. The flash controller according to claim 1, wherein the reading protection level is divided into a zero-level reading protection, a first-level reading protection and a second-level reading protection; the reading protection state is only valid at the first-level reading protection; and reading protection states of the plurality of sub-areas are valid at the same time.

10. A control method for controlling a flash controller, wherein the flash controller comprises an instruction bus interface, a data bus interface, a configuration register, an erase access filter module, a read/write access filter module and a flash control module, the method comprising:

receiving a control information by using the read/write access filter module, and deciding according to the control information whether to send a read/write access to the flash control module when the read/write access is received from the instruction bus interface or the data bus interface;

receiving the control information by using the erase access filter module, and deciding according to the control information whether to send an erase access to the flash control module when the erase access is received from the configuration register; and completing an access to a flash memory by using the flash control module according to the read/write access or the erase access;

wherein the flash memory comprises a user area configured to store a user program and an information area configured to store configuration information of a micro controller unit (MCU) chip, the access to the flash memory is an access to the user area or an access to the information area, the control information comprises a sub-area protection working method, a reading protection level controlled by a plurality of control bytes in the information area and a reading protection state, and the flash controller further comprises a sub-area protection control module and a reading protection control module;

wherein the reading protection control module is configured to receive option bytes from the information area, determine whether a current access to the user area comes from a debugging method, determine the reading protection level and the reading protection state according to the option bytes, send the control information including the reading protection level, the reading protection state and whether the current access to the user area comes from the debugging method to the erase access filter module and the read/write access filter module; the current access to the user area is the read/write access or the erase access; and the sub-area protection control module is configured to determine a current sub-area protection working method;

when the MCU chip boots from the user area, the user area is normally accessed by a central processing unit (CPU) instruction bus and restrictedly accessed by a central processing unit (CPU) data bus, but is not accessed by other master peripherals; the user area includes a plurality of sub-areas, each of the plurality of sub-areas comprises a corresponding working state and a transition state; after resetting the MCU chip, the flash controller enters an initial state; under the initial state, the CPU instruction bus is allowed to access all of the sub-areas, the CPU data bus is not allowed to access any of the sub-areas;

wherein the flash controller further comprises an option byte image and a debugging method monitoring module;

the option byte image is configured to duplicate the option bytes in the information area; and the debugging method monitoring module is configured to monitor whether the current access to the user area comes from the debugging method.

11. The method according to claim 10, wherein the flash controller comprises an internal bus matrix, and the read/write access is a read/write access needing to be immediately responded, a read/write access needing to be responded after a preset waiting time, or a read/write access not needing to be responded;

the method further comprises at least one of the following steps:

sending a first read/write access to the flash control module by using the read/write access filter module through the internal bus matrix when the first read/write access is determined as the read/write access needing to be immediately responded, and generating a first successful completion response and sending the first successful completion response to the corresponding instruction bus interface or the data bus interface when the flash control module completes a first access to the flash memory according to the first read/write access;

or sending a second read/write access to the flash control module by using the read/write access filter module through the internal bus matrix after a preset waiting time when the second read/write access is determined as the read/write access needing to be responded after a preset waiting time, and generating a second successful completion response and sending the second successful completion response to the corresponding instruction bus interface or the data bus interface when the flash control module completes a second access to the flash memory according to the second read/write access;

or generating an unsuccessful completion response and sending the unsuccessful completion response to the corresponding instruction bus interface or the data bus interface by using the read/write access filter module when a third read/write access is determined as the read/write access not needing to be responded.

12. The method according to claim 10, wherein the read/write access comprises an access of modifying option bytes;
the method further comprises:
sending the read/write access to an option byte image by using the read/write access filter module when the read/write access is determined as the access of modifying option bytes.

13. The method according to claim 10, wherein the erase access is an erase access needing to be responded or an erase access not needing to be responded; and the method further comprises at least one of the following steps:
sending a first erase access to the flash control module by using the erase access filter module when the first erase access is determined as the erase access needing to be responded, and generating a success erase response signal and sending the success erase response signal to the configuration register when the flash control module completes an access to the flash memory according to the erase access;
or
generating a failure erase response signal and sending the failure erase response signal to the configuration register by using the erase access filter module when a second erase access is determined as the erase access not needing to be responded.

14. The method according to claim 13, wherein the configuration register comprises an erase access completion status bit;
the method further comprises:
updating the erase access completion status bit by using the configuration register when the success erase response signal or the failure erase response signal is received.

15. The method according to claim 14, wherein the configuration register comprises an error flag bit;
the method further comprises:
updating the error flag bit by using the configuration register when the failure erase response signal is received.

16. The method according to claim 11, wherein the internal bus matrix is an interconnection matrix of an instruction bus and a data bus.

17. The method according to claim 10, wherein the reading protection level is divided into a zero-level reading protection, a first-level reading protection and a second-level reading protection; the reading protection state is only valid at the first-level reading protection; and reading protection states of the plurality of sub-areas are valid at the same time.

18. A non-transitory computer-readable recording medium having recorded thereon a program for executing a control method for a flash controller which comprises an instruction bus interface, a data bus interface, a configuration register, an erase access filter module, a read/write access filter module and a flash control module, wherein the control method comprises:

receiving control information by using the read/write access filter module, and deciding according to the control information whether to send a read/write access to the flash control module when the read/write access is received from the instruction bus interface or the data bus interface;
receiving control information by using the erase access filter module, and deciding according to the control information whether to send an erase access to the flash control module when the erase access is received from the configuration register; and
receiving an access to a flash memory by using the flash control module according to the read/write access or the erase access
wherein the flash memory comprises a user area configured to store a user program and an information area configured to store configuration information of a micro controller unit (MCU) chip, the access to the flash memory is an access to the user area or an access to the information area, the control information comprises a sub-area protection working method, a reading protection level controlled by a plurality of control bytes in the information area and a reading protection state, and the flash controller further comprises a sub-area protection control module and a reading protection control module;
wherein the reading protection control module is configured to receive option bytes from the information area, determine whether a current access to the user area comes from a debugging method, determine the reading protection level and the reading protection state according to the option bytes, send the control information including the reading protection level, the reading protection state and whether the current access to the user area comes from the debugging method to the erase access filter module and the read/write access filter module; the current access to the user area is the read/write access or the erase access; and
the sub-area protection control module is configured to determine a current sub-area protection working method;
when the MCU chip boots from the user area, the user area is normally accessed by a central processing unit (CPU) instruction bus and restrictedly accessed by a central processing unit (CPU) data bus, but is not accessed by other master peripherals; the user area includes a plurality of sub-areas, each of the plurality of sub-areas comprises a corresponding working state and a transition state; after resetting the MCU chip, the flash controller enters an initial state; under the initial state, the CPU instruction bus is allowed to access all of the sub-areas, the CPU data bus is not allowed to access any of the sub-areas;
wherein the flash controller further comprises an option byte image and a debugging method monitoring module;
the option byte image is configured to duplicate the option bytes in the information area; and
the debugging method monitoring module is configured to monitor whether the current access to the user area comes from the debugging method.

* * * * *